(12) United States Patent
Weber, Jr. et al.

(10) Patent No.: US 7,606,298 B1
(45) Date of Patent: Oct. 20, 2009

(54) METHOD OF TESTING REMOTE POWER LINE CARRIER PICK-UP COIL

(75) Inventors: John Robert Weber, Jr., Northport, NY (US); Fritz Heistermann, Hauppauge, NY (US)

(73) Assignee: DGI Creations, LLC, Raleigh, NC (US)

( * ) Notice: Subject to any disclaimer, the term of this patent is extended or adjusted under 35 U.S.C. 154(b) by 608 days.

(21) Appl. No.: 11/453,272

(22) Filed: Jun. 14, 2006

Related U.S. Application Data (63) Continuation-in-part of application No. 11/113,843, filed on Apr. 25, 2005, now Pat. No. 7,242,729.

(60) Provisional application No. 60/764,656, filed on Feb. 2, 2006, provisional application No. 60/690,224, filed on Jun. 14, 2005, provisional application No. 60/565,501, filed on Apr. 26, 2004.

(51) Int. Cl.
*H04B 3/46* (2006.01)

(52) U.S. Cl. ............ 375/224; 324/126; 324/509; 324/707

(58) Field of Classification Search ........... 375/224; 324/126, 509, 707
See application file for complete search history.

(56) References Cited

U.S. PATENT DOCUMENTS

| | | | |
|---|---|---|---|
| 3,909,821 A | 9/1975 | Jagoda et al. | 340/310 |
| 3,962,547 A | 6/1976 | Pattantyus-Abraham | 179/2.5 |
| 4,510,611 A | 4/1985 | Dougherty | 375/8 |
| 4,642,607 A * | 2/1987 | Strom et al. | 307/104 |
| 4,668,934 A * | 5/1987 | Shuey | 370/464 |
| 4,709,339 A | 11/1987 | Fernandes | 364/492 |
| 4,814,712 A | 3/1989 | Burton et al. | 324/424 |

(Continued)

FOREIGN PATENT DOCUMENTS

JP        11-288315        10/1999

(Continued)

OTHER PUBLICATIONS

Barwald W., "Telecommunications services over power lines", source(s): *IK-Ingenieur der Kommunikationstechnik*, vol. 47, No. 4, Jul.-Aug. 1997, pp. 28 30-32. Publisher: VT Verlag Technik, Germany. (1 pg Abstract).

(Continued)

*Primary Examiner*—Juan A Torres
(74) *Attorney, Agent, or Firm*—The Eclipse Group LLP; Kevin E. Flynn (57) ABSTRACT

Methods to test the operation of the pick-up coil without having to de-energize the power line serving as the power line carrier in order to perform testing on the pick-up coil. A series of test frequencies are introduced and parameters of the pick-up coil can be measured to detect the presence or absence of resonant behavior indicative of the health of the pick-up coil. Testing capabilities may be incorporated into a power line carrier receiver and use the connections between the pick-up coils and the receiver to perform the pick-up coil test. Various methods are disclosed for evaluating the pick-up coil response to a series of test inputs of different frequencies. These methods could be incorporated in a pick-up coil testing device that is independent of a receiver.

20 Claims, 7 Drawing Sheets

U.S. PATENT DOCUMENTS

| | | | |
|---|---|---|---|
| 5,894,223 A | 4/1999 | Medelius et al. | 324/529 |
| 6,104,707 A | 8/2000 | Abraham | 370/295 |
| 6,163,144 A | 12/2000 | Steber et al. | 324/67 |
| 6,304,838 B1 | 10/2001 | Brown | 703/18 |
| 6,388,564 B1* | 5/2002 | Piercy et al. | 340/310.11 |
| 6,452,482 B1 | 9/2002 | Cern | 340/310.01 |
| 6,456,192 B1 | 9/2002 | Bullock et al. | 340/310.01 |
| 6,466,029 B2* | 10/2002 | Stroth et al. | 324/509 |
| 6,734,784 B1 | 5/2004 | Lester | 340/310.02 |
| 6,812,716 B2* | 11/2004 | Fawcett | 324/707 |
| 6,933,714 B2 | 8/2005 | Fasshauer et al. | 324/76.21 |
| 6,933,835 B2 | 8/2005 | Kline | 340/310.06 |
| 6,950,010 B2 | 9/2005 | Aisa | 340/310.06 |
| 6,998,962 B2* | 2/2006 | Cope et al. | 370/351 |
| 7,049,939 B2 | 5/2006 | Ikeda et al. | 340/310.18 |
| 2004/0113756 A1* | 6/2004 | Mollenkopf | 340/310.01 |
| 2004/0183522 A1* | 9/2004 | Gunn et al. | 324/126 |
| 2005/0083925 A1* | 4/2005 | Bonicatto et al. | 370/389 |
| 2005/0111533 A1 | 5/2005 | Berkman et al. | 375/220 |
| 2006/0077047 A1* | 4/2006 | Zalitzky et al. | 340/310.11 |
| 2006/0091877 A1 | 5/2006 | Robinson et al. | 324/76.11 |
| 2006/0187074 A1* | 8/2006 | O'Sullivan et al. | 340/660 |

FOREIGN PATENT DOCUMENTS

| | | | |
|---|---|---|---|
| JP | 11288315 A | * | 10/1999 |
| JP | 2003-318788 | | 11/2003 |
| JP | 2003318788 A | * | 11/2003 |
| JP | 2005-204152 | | 7/2005 |
| JP | 2005204152 A | * | 7/2005 |

OTHER PUBLICATIONS

Burger et al., "Data communications over power lines: the DCS 3000 system", source(s): *Elektrie*, vol. 54, No. 5-6, 2000, pp. 132-138. Publisher: Dr. Heide & Partner, Germany. (1 pg Abstract).

Lim et al., "Development of a power line test bed for high-speed data communications" source(s): IPEC 2001. Fifth International Power Engineering Conference. Proceedings. Nanyang Technologies Univ. Part vol. 1, 2001. pp. 13-18 vol. 1. Singapore (2 pg Abstract).

Meng et al., "A Transmission Line Model for High-Frequency Power Line Communication Channel", Power System Technology, 2002. Proceedings. PowerCon 2002. International Conference on vol. 2, Oct. 13-17, 2002 pp. 1290-1295 vol. 2.

* cited by examiner

| F (kHz) | 0.307034 | | | | |
|---|---|---|---|---|---|
| L (mH) | 50 | | | | |
| C (nF) | 0.3 | 0.3 | XL (ohm) | 86.60 | |
| R1 (ohm) | 40 | 33 | XC (ohm) | 86.60 | |
| R2 (ohm) | 5 | | FO (kHz) | 45.94 | |
| | 50 | | | | |

| | FREQU | RES R | REAC X | MAGN Z | ANGLE Z | COND G | ADMIT B | G+G2 | MAGN Y | MAGN Z | ANGLE Z | R | X | ABS(X) |
|---|---|---|---|---|---|---|---|---|---|---|---|---|---|---|
| 0 | 40.0 | 5 | -24.1 | 24.59 | -1.37 | 0.0082708 | 0.0398214 | 0.0282708 | 0.05 | 20.48 | -0.95 | 11.85 | -16.70 | 16.70 |
| 1 | 41.5 | 5 | -17.7 | 18.35 | -1.29 | 0.0148566 | 0.0524461 | 0.0348566 | 0.06 | 15.88 | -0.98 | 8.79 | -13.23 | 13.23 |
| 2 | 43.0 | 5 | -11.5 | 12.52 | -1.16 | 0.0318951 | 0.0732238 | 0.0518951 | 0.09 | 11.14 | -0.95 | 6.44 | -9.09 | 9.09 |
| 3 | 44.5 | 5 | -5.5 | 7.46 | -0.84 | 0.0899166 | 0.0994903 | 0.1099166 | 0.15 | 6.75 | -0.74 | 5.00 | -4.53 | 4.53 |
| 4 | 46.0 | 5 | 0.2 | 5.00 | 0.04 | 0.1996455 | -0.008413 | 0.2196455 | 0.22 | 4.55 | 0.04 | 4.55 | 0.17 | 0.17 |
| 5 | 47.5 | 5 | 5.8 | 7.63 | 0.86 | 0.08578 | -0.098984 | 0.10578 | 0.14 | 6.90 | 0.75 | 5.04 | 4.72 | 4.72 |
| 6 | 49.0 | 5 | 11.2 | 12.23 | 1.15 | 0.033428 | -0.07462 | 0.053428 | 0.09 | 10.90 | 0.95 | 6.34 | 8.86 | 8.86 |
| 7 | 50.5 | 5 | 16.4 | 17.15 | 1.27 | 0.0170078 | -0.055788 | 0.0370078 | 0.07 | 14.94 | 0.99 | 8.26 | 12.45 | 12.45 |
| 8 | 52.0 | 5 | 21.5 | 22.07 | 1.34 | 0.0102609 | -0.044124 | 0.0302609 | 0.05 | 18.69 | 0.97 | 10.57 | 15.41 | 15.41 |
| 9 | 53.5 | 5 | 26.5 | 26.94 | 1.38 | 0.0068884 | -0.036472 | 0.0268884 | 0.05 | 22.07 | 0.94 | 13.10 | 17.76 | 17.76 |
| 10 | 55.0 | 5 | 31.3 | 31.73 | 1.41 | 0.0049676 | -0.031126 | 0.0249676 | 0.04 | 25.06 | 0.89 | 15.68 | 19.55 | 19.55 |
| 11 | 56.5 | 5 | 36.1 | 36.42 | 1.43 | 0.0037691 | -0.027196 | 0.0237691 | 0.04 | 27.69 | 0.85 | 18.22 | 20.85 | 20.85 |
| 12 | 58.0 | 5 | 40.7 | 41.03 | 1.45 | 0.0029698 | -0.02419 | 0.0229698 | 0.03 | 29.98 | 0.81 | 20.64 | 21.74 | 21.74 |
| 13 | 59.5 | 5 | 45.3 | 45.56 | 1.46 | 0.002409 | -0.021817 | 0.022409 | 0.03 | 31.97 | 0.77 | 22.91 | 22.30 | 22.30 |
| 14 | 61.0 | 5 | 49.8 | 50.01 | 1.47 | 0.0019996 | -0.019898 | 0.0219996 | 0.03 | 33.71 | 0.74 | 25.00 | 22.61 | 22.61 |
| 15 | 62.5 | 5 | 54.1 | 54.38 | 1.48 | 0.0016909 | -0.018312 | 0.0216909 | 0.03 | 35.23 | 0.70 | 26.92 | 22.72 | 22.72 |

FIG. 8

METHOD OF TESTING REMOTE POWER LINE CARRIER PICK-UP COIL

This application claims priority and incorporates by reference two co-pending United States Provisional Applications for Methods of Testing Remote Power Line Carrier Pick-Up Coil having Ser. Nos. 60/690,244 and 60/764,656. This application claims priority and incorporates by reference both a related application, U.S. application Ser. No. 11/113,843 for Signal Decoding Method and Apparatus and its priority document U.S. Provisional Application No. 60/565,501 which describe a particular way to process the analog signal retrieved from the power line by the pick-up coil.

BACKGROUND OF THE INVENTION

Technical Field

The present invention pertains to the field of data communications over power lines. This form of data communication, called power line carrier, introduces a high frequency analog signal onto a cable used to convey power in a portion of an electric distribution network. The analog signal is received at a distant receiver through the use of pick-up coil rather than risk damage by directly connect the receiver to the high voltage/high current power line cable. The present invention provides a way to test the operation of the pick-up coil without having to de-energize the power line serving as the power line carrier in order to perform testing on the pick-up coil.

Pick-up coils to retrieve data communications from a power line carrier are well known in the art. These pick-up coils have been known in the art for years.

There is a need for a device to perform coil testing remotely, upon command as it is inconvenient to dispatch technicians to test the pick-up coils at remote and normally un-staffed locations.

The method of testing known in the art is so inconvenient and time consuming that it was rarely performed. The first step in one prior art method of testing the pick-up coils is to remove the feeder from service as the power company would not want to put a technician near a live feeder at voltages of 4 kv to 27 kv. So in addition to having the technicians that test the coils travel to a remote location to test the coils, the power company would need to dispatch other personnel to perform the tasks of removing the feeder from service. In order to ensure the safety of the technician, special connections are made to visibly ground the feeder wire so that the technician has a visible indication that the feeder is indeed removed from service. The safety procedures may also include formal processes to physically lock certain equipment so that the feeder cannot be energized while the technicians are working. This requirement of taking a feeder out of service by itself would make testing an inconvenient and time consuming act.

After the feeder was removed from service and grounded to ensure the safety of the technician, the technician would use a signal generator, attenuation pad, and a spectrum analyzer. As a single receiver will process the information gained by a large set of pick-up coils, the technicians first isolate a pick-up coil from the receiver. After isolating the pick-up coil, one technician applies a series of 10 to 20 test frequencies and verifies that the response from the pick-up coil at its resonant frequency is much less than at other test frequencies as this indicates that the components are operating properly. If the set of results for the set of test frequencies does not include the appropriate dip at the resonant frequency, then the pick-up coil is not operating properly.

A typical receiver might have 36 different inputs from 36 different pick-up coils. Some of these pick-up coils may actually be hundreds of feet from the receiver. To test the entire set of 36 different pick-up coils would require the application of 360 to 720 test frequencies to the wires connecting the pick-up coils to the receiver. Setting up testing equipment at up to 36 different locations around a receiver and applying a series of test frequencies to each pick-up coil is a time consuming task that might take two technicians as long as 6 hours to test a set of 36 coils, plus the time needed to isolate and ground the feeder and finally to remove the ground connections so the feeder could be placed back into service. As a power grid may have thousands of pick-up coils, the testing of an individual pick-up coil is done very rarely.

Another prior art method of testing pick-up coils does not require the feeder bus to be isolated and grounded as the pick-up coils are tested using the low voltage signal connection to the pick-up coil. While less inconvenient than removing the feeder from service, this process still requires a trip to the substation and the sequential application of test signals to each of the pick-up coils. Even this less inconvenient method of testing pick-up coils is sufficiently inconvenient that it is rarely done.

Unfortunately, the input to a receiver from a bad coil does not provide a clear indication that a pick-up coil has failed. The reason for this is the proximity of other pick-up coils frequently leads to cross talk so that a receiver is provided a set of data on the wire from a bad pick-up coil that is a duplicate of good data obtained on a functioning pick-up coil located near the failed pick-up coil. The combination of cross-talk masking bad coils and the infrequent testing makes it possible that a failed coil could remain in service for years. In some instances almost half of the 32 pick-up coils providing input to a receiver at a substation have been found to be bad upon testing. This situation was not detected much earlier as it takes the failure of a number of pick-up coils in the same general vicinity before there is not a signal to be obtained through cross-talk.

Thus, the prior art lacks a way to efficiently test pick-up coils to verify that they are operating properly rather than feeding the receiver a crosstalk signal from a nearby pick-up coil.

The prior art also lacks a way to efficiently test pick-up coils to detect a degradation in performance so that a pick-up coil can be put on the schedule to be replaced at a convenient time before the pick-up coil degrades to the point of failure.

The present invention addresses these shortcomings in the prior art and provides other advantages as evident from reading the description and reviewing the drawings. Particular implementations of the present invention may address particular shortcomings in the prior art without addressing all the shortcomings of the prior art and still be within the scope of the claims that follow.

SUMMARY OF THE DISCLOSURE

The present invention pertains to the use of power line carrier communications which introduces a high frequency analog signal onto a cable used to convey power in a portion of an electric distribution network. The analog signal is received at a distant receiver through the use of pick-up coil rather than risk damage by directly connect the receiver to the high voltage/high current power line cable. The present invention provides a way to test the operation of the pick-up coil. A series of test frequencies are introduced and parameters of the pick-up coil can be measured to detect the presence or absence of resonant behavior indicative of the health of the pick-up coil. The present invention may be incorporated into a power line carrier receiver and use the connections between the pick-up coils and the receiver to perform the pick-up coil test. Various methods are disclosed for evaluating the pick-up coil response to a series of test inputs of different frequencies. These methods could be incorporated in a pick-up coil testing device that is independent of a receiver.

DETAILED DESCRIPTION

The present invention will now be described more fully hereinafter with reference to the accompanying drawings, in which implementations of the invention are shown in order to teach the invention to those of skill in the art.

Figure 1:
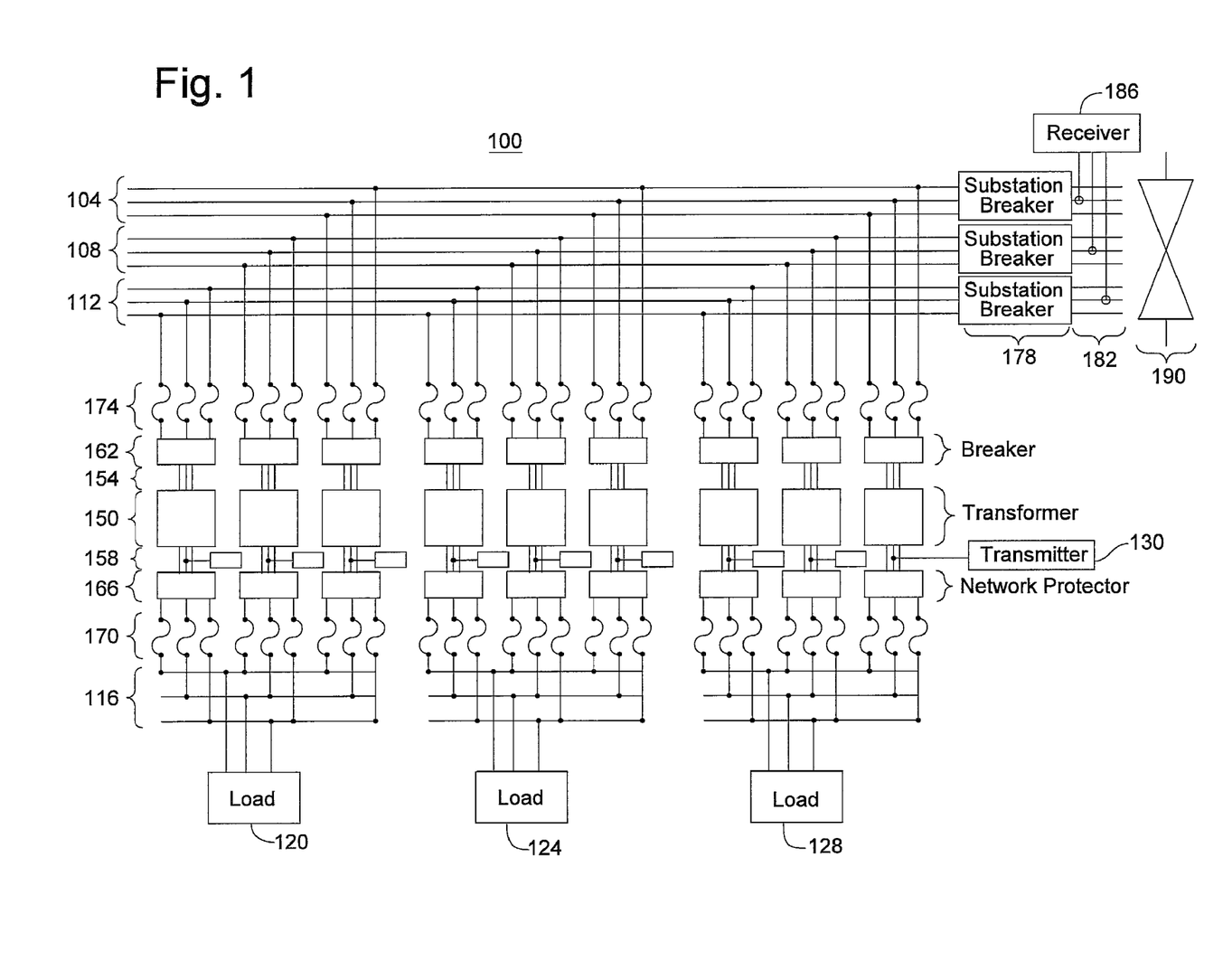
FIG. 1 is a diagram of a portion of a power distribution network that introduces various components of interest to the present disclosure.

A simplified drawing is provided in FIG. 1 to introduce certain relevant components. As the focus of this application is on the testing the pick-up coil, many relevant components that would be present in an actual power grid distribution system have been omitted.

A portion of an electrical distribution network is shown as network 100. Network 100 has feeder bus 104, feeder bus 108, and feeder bus 112. A representative voltage for operation of these feeder buses may be 13 kv but other systems may operate at 27 kv, 34 kv or some other voltage. The power on these three buses is provided to a set of local distribution networks 116 to serve loads represented by 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, 112). Even when the load can consistently be serviced by just one feeder bus, a desire for reliability leads to providing a redundant path for providing service in case of equipment failure, scheduled maintenance, load balancing, or other needs. (Actual networks may have more than three possible feeder buses connected to a particular local distribution network but simplified FIG. 1 is sufficient for introducing the concepts relevant to the present invention.)

The local distribution networks 116 are coupled to the feeder buses 104, 108, and 112 through transformers 150 and related equipment. The transformers 150 convert the relatively higher voltage on the primary side 154 of the transformers 150 to the relatively low voltage on the secondary side 158 of the transformers 150.

The transformers 150 have breakers 162 on the primary side to isolate the transformers 150 from the feeder buses (104, 108, 112). The transformers 150 have network protectors 166 on the secondary side 158 of the transformers 150 to isolate the transformers 150 from the local distribution networks 116 as needed to protect the transformers from current flowing from the distribution networks 116 to the primary side 154 of the transformers (known as back feed).

Additionally, some networks include sets of fuse links 170 between the network protectors 166 and the local distribution networks 116. Some networks including sets of primary fuse links 174 between the breakers 162 and the feeder buses 104, 108, and 112.

The feeder buses 104, 108, and 112 can be isolated by a set of substation breakers 178 from the transmission network 182 which is ultimately connected to a set of power sources that drive generators. The power sources are symbolically represented here by turbine 190.

FIG. 1 shows a small portion of the network which may have more feeder buses and many more local distribution networks 116 providing power to many more loads. These loads may be distributed around a portion of a city. The various transformers 150 may be in pits (vaults) near the various loads. Thus it is convenient to inject analog signals onto the power lines so that the analog signals can be picked off by pick-up coils at the substation and fed to a receiver 186. These analog signals are often in the frequency range of 40 kHz to 70 kHz which is much higher than the frequency of the power being distributed over the network. (For example one common frequency for power grids is 60 Hertz although other frequencies are used throughout the world and can be used in connection with the present invention).

Co-pending and commonly assigned U.S. patent application Ser. No. 11/113,843 for Signal Decoding Method and Apparatus describes one system to decode information sent by phase shift keying over one of several possible carrier frequencies. While Phase Shift Keying is a known method for increasing the information density in a data transmission, the details of Phase Shift Keying are not relevant to an understanding of the present invention.

Co-pending and commonly assigned U.S. patent application Ser. No. 11/344,402 for Alternative Communication Paths for Data Sent Over Power Line Carrier sets forth alternative positions for placement of the transmitter (such as 130) and other techniques to provide alternative communication paths to allow a data record to travel from the transmitter (such as 130) to the receiver 186.

A preferred location for injecting the analog signal containing information about the operation of a transformer and related equipment is on the secondary side 158 of the transformer between the transformer 150 and the network protector 166. Transmitter 130 is shown in FIG. 1 to illustrate this location. Placement of transmitter 130 in this location allows for the injection of the analog signal onto the relatively low voltage, secondary side of the transformer 150. Traversing the transformer 150 from secondary side to primary side provides only a slight attenuation of the high frequency carrier signal. A primary data path for the data on the power line carrier signal is from transmitter 130 on the secondary side 158 of the transformer 150 to the primary side 154, then through the breaker 162, primary fuse 174, feeder bus 104, substation breaker 178, pick-up coil and ultimately to receiver 186.

One of skill in the art will recognize that the power line carrier signal could be injected on the primary side 154 of the transformer 150 but working with higher voltage bus lines is generally more cumbersome than working with the lower voltage bus line.

In order to provide a coherent example, the present invention will be described with respect to a current use of the invention by DIGITALGRID, INC.® in a front end board (FEB) of a receiver that receives information from remote transmitters. The details provided are not limitations on the invention beyond the limitations explicitly present in the claims deemed allowable by the patent examiners that approved them.

An input to some implementations of the present method is a clock signal created for the Front End Board to allow it to operate synchronously with the transmitter. The creation of the input is described in connection with FIG. 2.

Creation of Clock Pulses for Use by the Front End Board

Figures 2, 3:
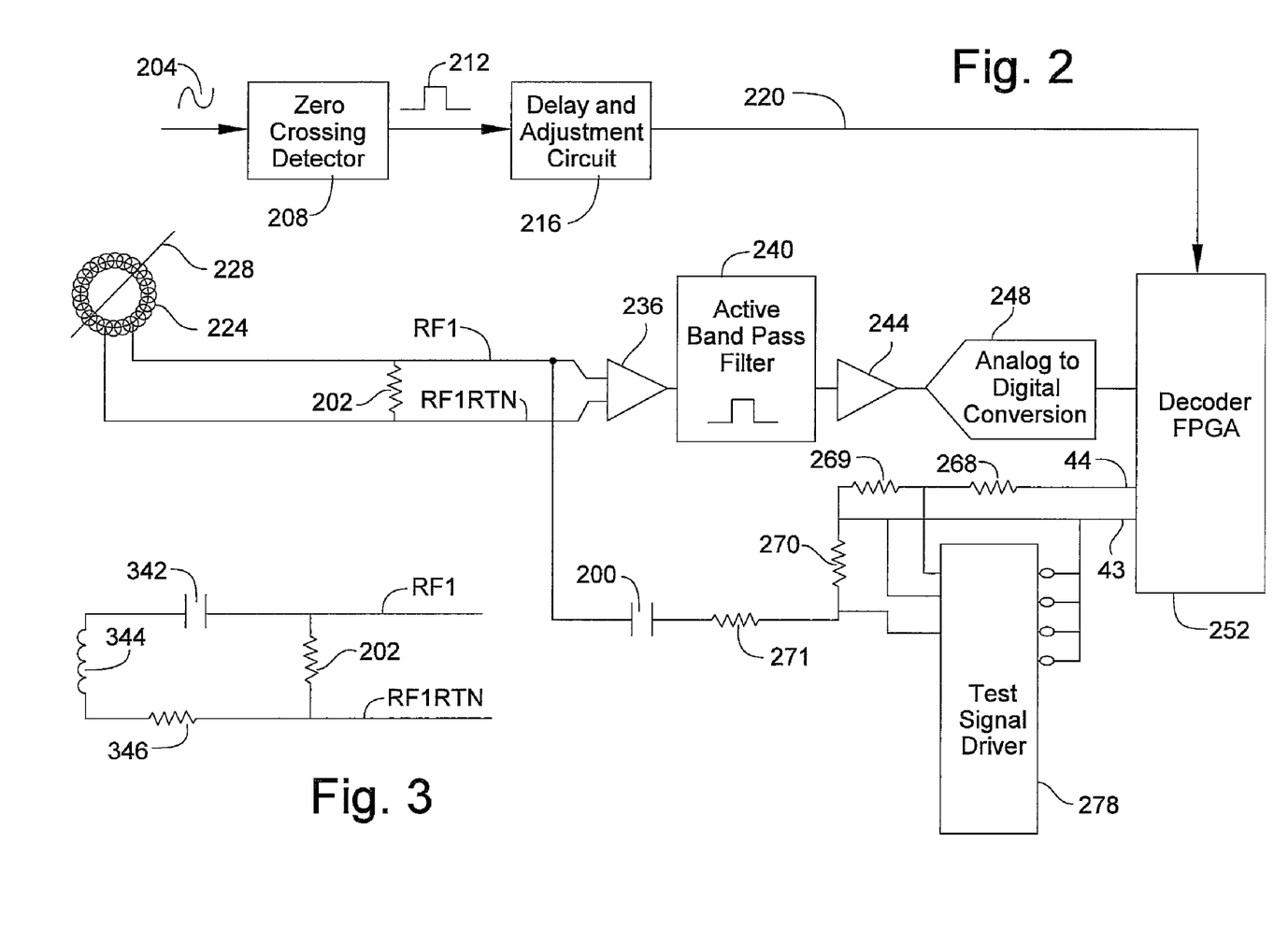
FIG. 2 is a diagram of that shows relevant components from a Front End Board of a receiver that implements teachings of the present invention and a connected pick-up coil.
FIG. 3 is an electrical representation of a pick-up coil as connected to the components of FIG. 2.

While the FEB is receiving the carrier signal, the zero crossing of the 60 Hz signal on the power line carrier is detected. As shown in FIG. 2, the 60 Hz signal 204 is monitored by a zero crossing detector 208 which outputs a series of pulses 212. The 60 Hz signal can be acquired from the power source for the FEB assuming that the FEB runs on power connected to the AC network rather than "clean" AC generated from DC. The series of pulses 212 are fed to a delay and adjustment circuit 216 that outputs a set of clock signals 220 with various offsets to the detected zero crossings. As there are two zero crossings per cycle, the frequency of the zero crossing is 120 Hz which is slightly less frequent than one zero crossing every 8.33 milliseconds.

This is not to imply that the invention is limited to 60 Hz applications. Other frequencies can be used provided that the time interval between zero crossings is sufficiently long to allow a reasonable sample of the data carrying carrier frequency. For example, many countries use power systems that operate at various voltages but at a frequency of 50 Hz. The present invention could be extended to that frequency with the proportional timing adjustment for the increase in interval length between zero crossings.

The carrier signal from the transmitter is decoupled from the power line carrier by a pick-up coil 224 such as a Rogowski air coil as is known in the art. The principles of a Rogowski coil are well-known to those of skill in the art, but to provide context to those not of skill in the art, the following overview may be helpful. A conductor coil is wound around a "former" in the shape of a ring. The windings form an air cored coil which is placed next to the power line conductor of interest 228. The magnetic fields associated with the power line carrier current (PLCC) flowing through the power line conductor are measurable indirectly as the output voltage from the pick-up coil 224. The properties of the pick-up coil 224 can be represented by a set of components shown in FIG. 3. (Capacitor 342, coil 344, and resistor 346) As the value of resistor 346 is much less than resister 202, the impedance across the pick-up coil at resonance where 342 and 344 cancel each other out is close to a short. As described more completely below, measuring the characteristics of the pick-up coil at a set of input frequencies around the resonant frequency provides a clear indication on whether the pick-up coil is showing signs of resonant behavior or is not showing signs of resonant behavior.

The front end board (FEB) receives a carrier signal on an input port from the pick-up coil 224. The FEB may be adapted to receive inputs on set of different carrier frequencies. For example, in one implementation by DIGITALGRID, INC.®, four carrier frequencies are used. As implemented, the FEB can receive and decode all four carrier frequencies at the same time.

The pick-up coil 224 inductance and the values of the coupling capacitor and various resistors are chosen to place the resonant frequency for the pick-up coil somewhere close to the middle of the range of carrier frequencies used to carry data on the power line. For a system using carrier frequencies in the range of 42 kHz to 67 kHz, the resonant frequency of the pick-up coil 224 might be chosen to be 50 kHz. At the resonant frequency, the reactances from the coil 344 and the capacitor 342 cancel each other out so that the total impedance is merely the effective resistance from the relevant resistors (344 and 202). By measuring voltage in response to injected signals at a variety of frequencies around the resonant frequency, the drop in impedance at resonance is reflected in the voltage readings. Any change in the pick-up coil would alter its reaction to an input at the expected resonant frequency.

As one implementation of the present invention is to have the pick-up coil test conducted by a power line carrier receiver, it is useful to discuss an example of how a power line carrier receiver could use some of the same processing steps used for incoming data conveyed from a power line carrier transmitter for the processing of the response to the pick-up coil test.

The Path for Incoming Data from the Transmitter

The front end board (FEB) receives a power line carrier signal on an input port from the pick-up coil 224 after the carrier signal is removed from the power line 228. The FEB is adapted to receive input on from any of the carrier frequencies used in the particular implementation.

After reception on the input port, the power line carrier signal is amplified by a preamplifier 236. FIG. 2 does not convey the great distance that typically separates the pick-up coil 224 from the beginning of the Front End Board represented by preamplifier 236. The distance is often on the order of magnitude of 300 feet.

After the preamplifier 236, the signal passes through an active band pass filter 240 which provides some additional voltage gain. The range for the band pass filter will be a function of the range of carrier frequencies to be used. In one implementation, the band pass filter is set to pass signals between 42 kHz to 65 kHz.

After the active band pass filter 240, the signal passes through a post amplifier 244 that conditions the signal for the Analog to Digital conversion (ADC) 248. Conditioning the signal in one implementation comprises centering the carrier signal to 2.5 volts DC as this is in the center of the range for the ADC unit.

The ADC samples the analog voltage frequently. In a one implementation, the ADC samples the analog voltage every 2 microseconds. The sampled analog voltage is converted to a 16 bit binary representation of the voltage.

The stream of 16 bit representations of the voltage ("digital image") pass to the decoder FPGA 252. In one implementation, the zero line crossings repeat approximately every 8.33 milliseconds and the transmitter sends out a carrier signal for approximately 8.3 milliseconds. For each 8.33 millisecond interval 6.4 milliseconds are sampled which translates to 3200 samples of 16 bit precision of the voltage of the carrier signal. As an implementation detail, the 6.4 millisecond sample starts approximately one millisecond after the zero crossing and ends approximately a millisecond before the next zero crossing as there is little coherent energy at or very near the zero crossing.

There are additional processing steps to actually decode the signal from the pick-up coil 224 that is provided to the FPGA 252 including decoding phase shift keying if used in that particular implementation. These details are not central to understanding the present invention but for those with an interest, this material is set forth in the above-referenced U.S. application Ser. No. 11/113,843 for Signal Decoding Apparatus and Method. The '843 application describes a particular way to process the analog signal retrieved from the power line 228 by the pick-up coil 224.

As introduction to the concepts used in one type of phase shift keying decoder it is important to remember that every sinusoid can be expressed as the sum of a sine function (phase zero) and a cosine function (phase $\pi/2$). If the sine part is called the "in-phase" component, the cosine part can be called the "phase-quadrature" component. In general, "phase quadrature" means "90 degrees out of phase," i.e., a relative phase shift of $\pi/2$. Thus an incoming sinusoid can be represented as some combination of in-phase (I) and phase quadrature (Q) components.

For purposes of providing a quick overview of the Signal Decoding Apparatus an Method disclosed in U.S. application Ser. No. 11/113,843, one implementation can be summarized as follow:

A) Detecting a zero crossing of the alternating current operated at the power grid frequency.

B) Converting at least a portion of a received analog signal carried on the carrier frequency to a set of digital samples, the portion corresponding to the analog signal received during a sampling window established in relation to the detected zero crossing on the alternating current operated at power grid frequency.

C) Using the detected zero crossing as a trigger to create a set of digital values of an ideal sine wave with a frequency substantially equal to the carrier frequency and creating a set of digital values of an ideal cosine wave with a frequency substantially equal to the carrier frequency.

D) Multiplying the subset of sampled digital values from the portion of the received analog signal with a corresponding set of created digital values from the ideal sine wave and storing the sum of the products as the In-Phase Component of the set of digital samples.

E) Multiplying the subset of sampled digital values from the portion of the received analog signal with a corresponding set of created digital values from the ideal cosine wave and storing the sum of the products as the Quadrature Component of the set of digital samples.

F) Obtaining a phase offset from an ideal sine wave for the received analog signal by obtaining the arctangent of the (In Phase Component divided by the Quadrature Component) to decode the binary information conveyed by phase shift keying in the received analog signal.

There are many implementation details that can facilitate this process including shifting the values stored in the accumulators so that at least one of the values has a most significant bit of 1 and then comparing the pair of shifted values against a look-up table to get the estimated phase shift. (Shifting the bits is useful for a receiver that is receiving transmissions from truly remote transmitters where the signal strength of the transmitted signals varies quite a bit as this reduces the size of the look-up table needed to resolve the I/Q pair into a phase angle.)

Those of skill in the art will appreciate that multiplying the subset of sampled digital values against several sets of created digital values (sine and cosine) for different carrier frequencies and sending the products to different accumulators allows the decoding of one or more analog signals received using one or more different carrier frequencies. One of skill in the art will understand that a minimum threshold for absolute values of accumulators may be useful to distinguish between a received signal at a particular carrier frequency and background noise.

Those of skill in the art will recognize that shifting and complimenting values for I and Q can be used to transform data from three of the four quadrants (+I,−Q), (−I,−Q), and (−I,+Q) into the (+I,+Q) quadrant to decrease the size of the look-up table. Those of skill in the art will recognize that the estimated phase shift would be converted to one of the expected nominal phase shifts for the type of phase shift keying that is being used. For example for QPSK, the phase shifts would be 0, 90, 180, and 270 degrees to convey one of the four possible binary values.

It may be acceptable to simply use values based upon a square wave or some other approximation of a sinusoids instead of ideal sine and cosine waves. While the match between a received sine wave with zero degree offset with the something other than an ideal sine wave will be less than perfect, the matching is sufficient so that the estimated phase shift can be reliably converted to the nominal phase shift (for example 0, 90, 180, or 270). The process is more heavily reliant on having a set of values based on waveforms with the proper frequency and a known phase relationship with a standard, than the actual shape of the waveform.

The Process of Testing the Pick-Up Coil

The coil tester operates by injecting a current into the pick-up coil and measuring the voltage which this current produces across the pick-up coil. In one implementation, the in-phase and quadrature components of this voltage are measured, as this can be done using the tools already implemented in the receiver for decoding the phase shift keying on the power line carrier signal. The frequency of the injection current is swept over the frequency range of interest, e.g. from 42 kHz to 65 kHz. In a digital implementation the frequency sweep would be accomplished by a number of discrete frequency steps, e.g. 16 discrete frequencies within the range from 42 kHz to 65 kHz. In one particular implementation the test frequencies are: 42.37 kHz, 43.10 kHz, 43.86 kHz, 44.64 kHz, 46.30 kHz, 47.17 kHz, 48.08 kHz, 49.02 kHz, 51.02 kHz, 52.08 kHz, 53.19 kHz, 54.35 kHz, 56.82 kHz, 58.14 kHz, 59.52 kHz, and 60.98 kHz.

In one implementation of the present invention, the current is injected at each of the test frequencies (also called sweep frequencies) within one 8.33 msec time period occurring between two subsequent zero crossings of the 60 Hz power grid frequency. In one implementation, the test frequencies are selected to not overlap with the power line carrier frequencies used for carrying data from the transmitter to the receiver via the pick-up coil. A system using a different frequency for the power line carrier may use different sweep frequencies or a different number of sweep frequency points. The amplitude of the test signals used for the sweep frequencies may be set to be sufficiently large that the test results will not be unduly distorted by noise on the feeder.

While one implementation does not use test frequencies that overlap carrier frequencies, this is not a requirement. The testing of the pick-up coil could be conducted during a period when the power line carrier transmitter will not be transmitting on an overlapping frequency. The testing of the pick-up coil could be conducted even while the power line carrier transmitter is sending data using a power line carrier frequency that overlaps one of the test frequencies as long as the signal strength of the power line carrier frequency as received at the receiver is not strong enough to significantly distort the pick-up coil test results for a given frequency. Given that the pick-up coil test merely confirms that the pick-up coil is exhibiting expected resonant behavior, a small amount of distortion may not present a problem.

Figure 4:
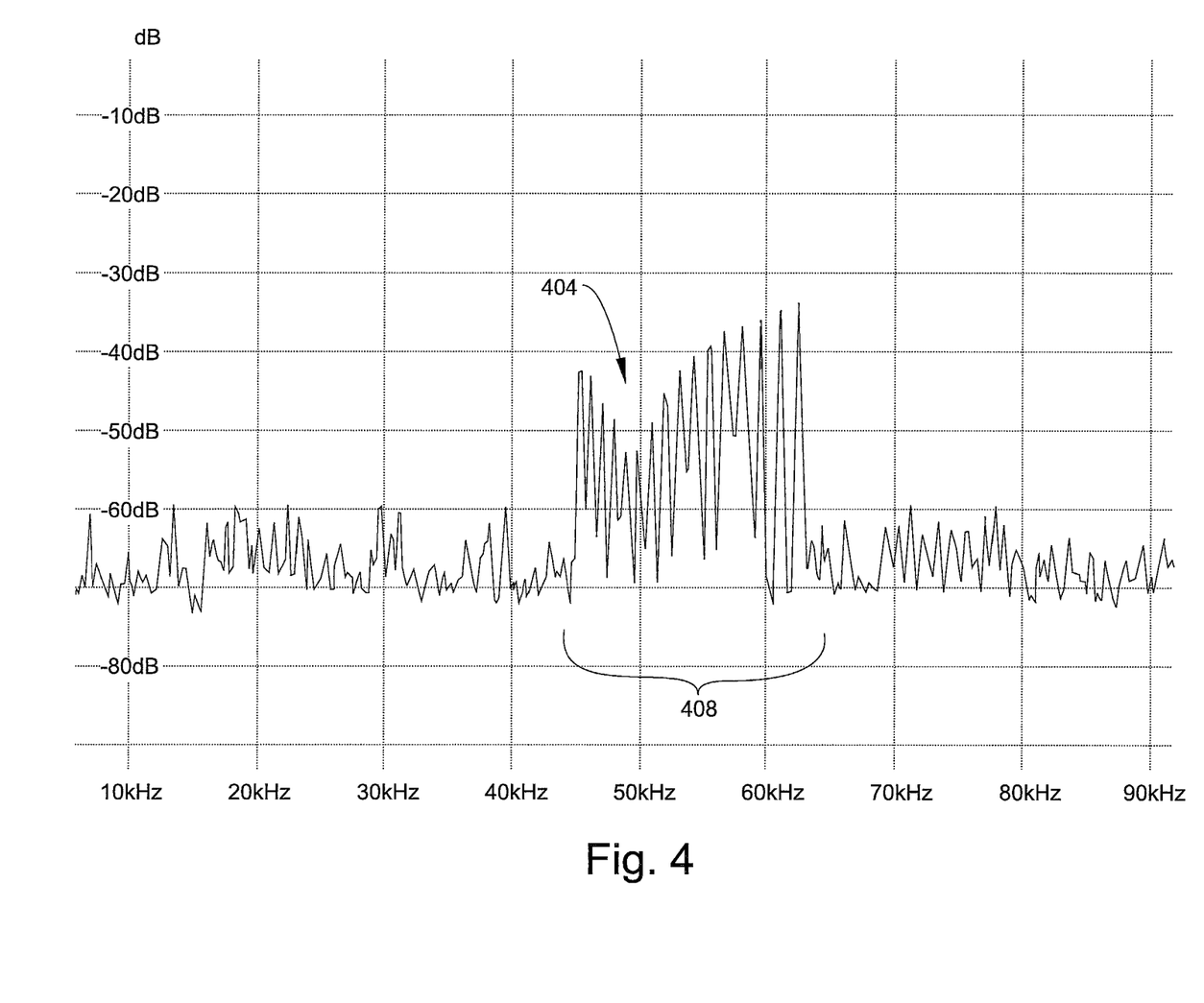
FIG. 4 is a graph showing the response behavior of a pick-up coil to a set of input frequencies illustrating the dip near resonance indicative of a properly operating pick-up coil.

The response on a spectrum analyzer for a properly operating pick-up coil is shown in FIG. 4. The response set for a properly operating pick-up coil will show a characteristic drop 404 in response to the sweep frequencies 408 around the resonant frequency of the pick-up coil as the impedance of the pick-up coil (inductance and capacitance) with respect to the sweep frequency at its resonant frequency will approach zero (short). In this case the pick-up coil has a resonant frequency around 50 kHz and a drop in measured response is seen near 50 kHz.

Figure 5:
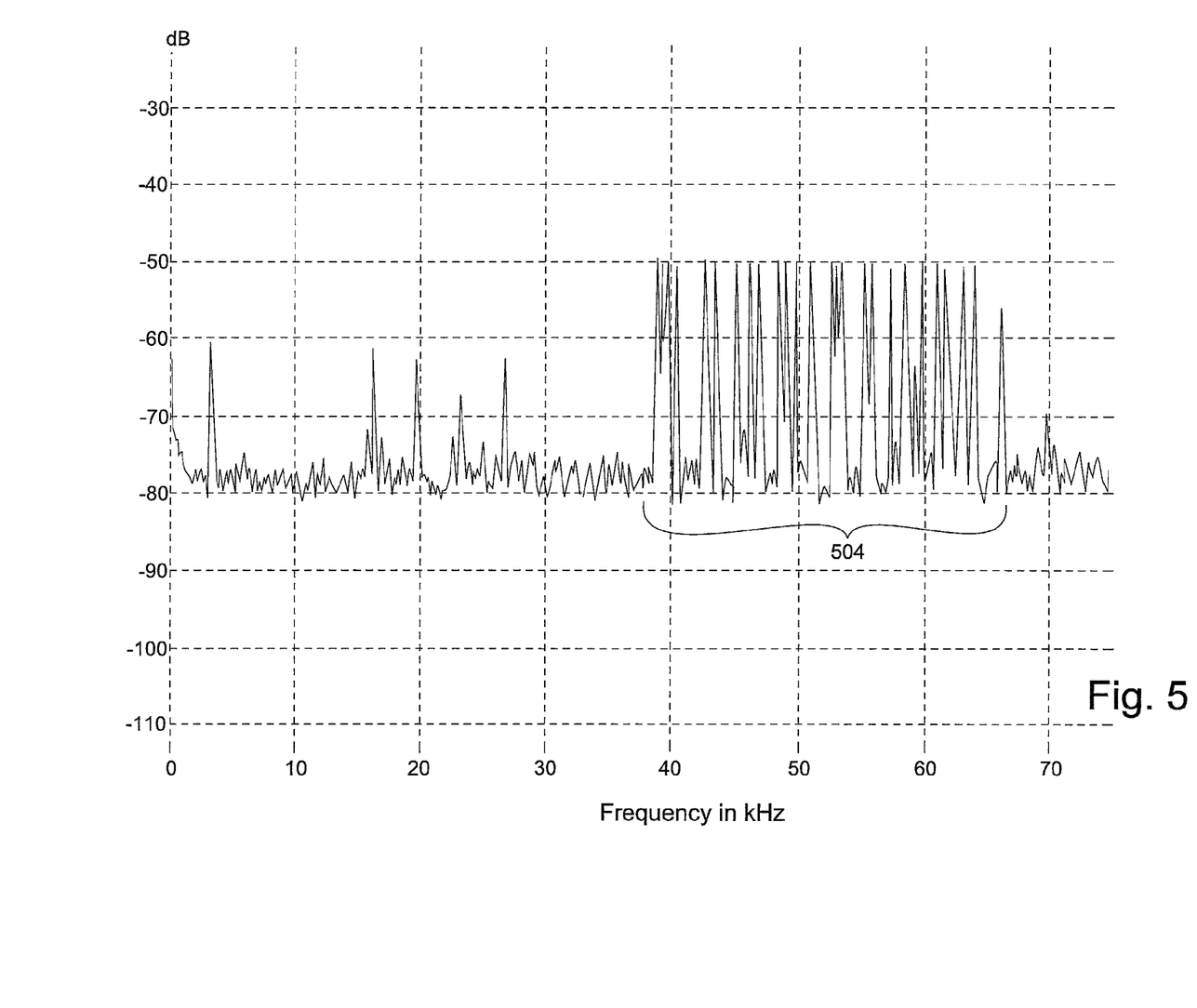
FIG. 5 is a graph showing the response behavior of a pick-up coil to a set of input frequencies illustrating the lack of a dip near resonance indicative of a pick-up coil that is not operating properly.

A pick-up coil that is not operating properly will not show this resonant response dip and will have a substantially flat set of responses across the set of test frequencies 504. A representative response on a spectrum analyzer is shown in FIG. 5. A pick-up coil lacking the characteristic response curve of a properly functioning pick-up coil can be identified as defective and replaced when it is convenient to do so. Typically, pick-up coils are replaced and repaired later rather than repaired in the field.

Figure 6:
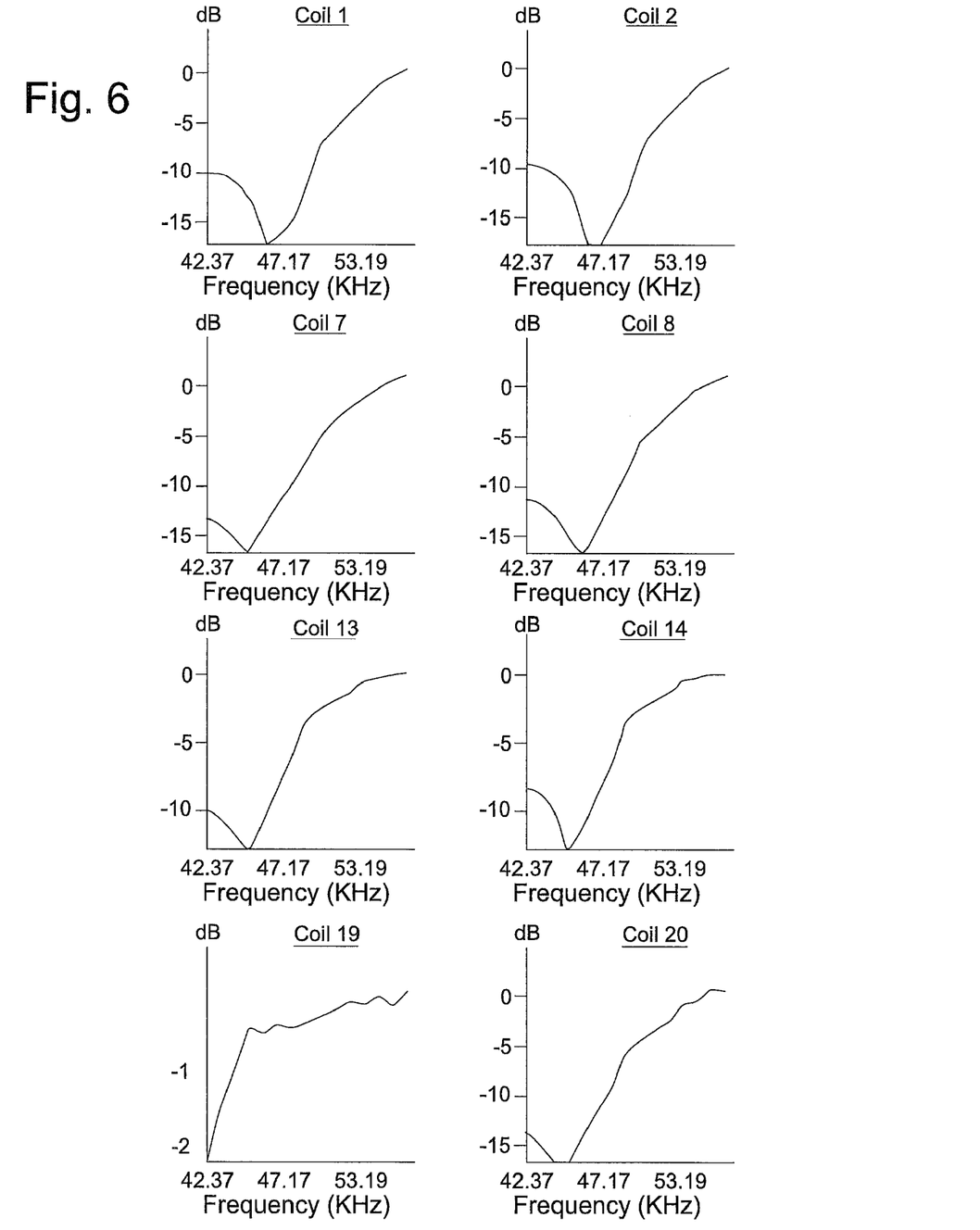
FIG. 6 is a collection of graphs representing data collected by an implementation of the present invention from a set of pick-up coils.

FIG. 6 shows a set of normalized graphs of the responses of testing a series of coils using one implementation of the present invention. The graphs for pick-up coils 1, 2, 7, 8, 13, 14, and 20 resemble one another with a dip around the frequency of 45 kHz. Coil 19 in contrast has a relatively flat response (when one takes into account that the range for Coil 19 is around 2 dB rather than 12 to 16 dB as for the other coils). This Coil 19 is not operating properly and would be identifiable as such even though the normalized response does not appear as flat as seen in FIG. 5.

The output from the pick-up coil test is a set of digital measurements reflecting the response to the set of test frequencies.

One implementation of the present invention converts the set of response measurements to a visual graph analogous to the graphs shown in FIG. 6.

The mechanics of conducting a pick-up coil test as an added feature for one particular power line carrier are as follows. A coil test command is sent on the data lines from the receiver processor (not shown) to the FPGA 252 on the Front End Board. This activates the coil test function residing in FPGA 252. The coil test function then generates the signal sequence, which was described earlier. A set of alternating current inputs of particular test frequencies are input to the pick-up coil. The coil tester also measures the alternating voltage received from the pick-up coil, in the same way the data signals are received. The coil tester's signal is produced at a pin 44 on the FPGA as a 5 V peak to peak voltage. Resistors 268 and 271 in combination with capacitor 200 cause a current of approximately 400 microamps of peak to peak current to be injected into the pick-up coil which is connected to the other side of capacitor 200. (When Pin 43 of FPGA 252 is asserted, 278 acts to short across resistors 269 and 270. Element 278 may be called the Test Signal Driver.)

The phase of the injection current may be pre-distorted to compensate for the phase response of the band pass filter. The pick-up coil test signals use the same signal path (described above) as the data signals up to the FPGA 252.

Internal to the FPGA 252, the pick-up coil test signals are routed to the pick-up coil test function. The pick-up coil tester may process the received test signals concurrently with data signals being processed by the data signal processor. After each burst interval (8.33 msec) the digital representations of the voltage measurements are presented on the data lines of the FPGA 252. The processor (not shown) will read this data and translate the data for the desired display.

Figure 7:
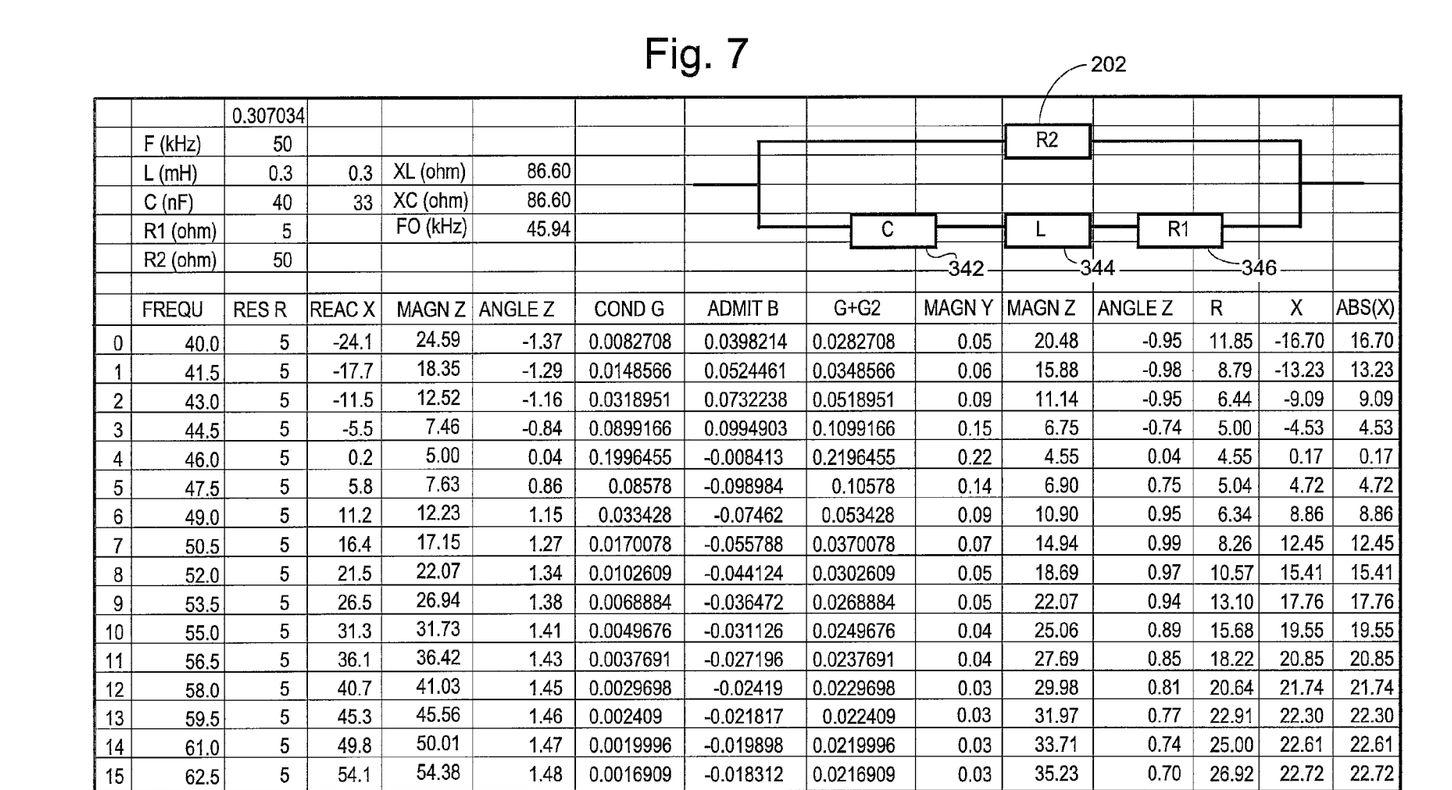
FIG. 7 is a chart with a series of values relevant to the impedance of a pick-up coil over a range of test frequencies including a test frequency near the expected resonance frequency for that pick-up coil.

While the examples given above show the attenuation of the input signal by showing drop in measured voltage in decibels of attenuation, other indications of resonant behavior could be used. FIG. 7 shows the variation of various parameters over a set of 16 samples (0-15). The circuit shown in FIG. 3 is recreated here with components 342, 344, 346, and 202. As resistor 346 is only five ohms, it is much less than resistor 202 that is 50 ohms. As the coil test input frequency approaches the coil circuit resonance of 45.94 kHz, various parameters reach their respective extreme values. Thus, the data for sample 4 taken for an input frequency of 46 kHz shows extreme values for the series (some are dips and some are peak values depending on the parameter). Thus, any one of a number of parameters could be measured over a range of input frequencies in order to test for the presence or absence of resonant behavior by the pick-up coil.

Figure 8:
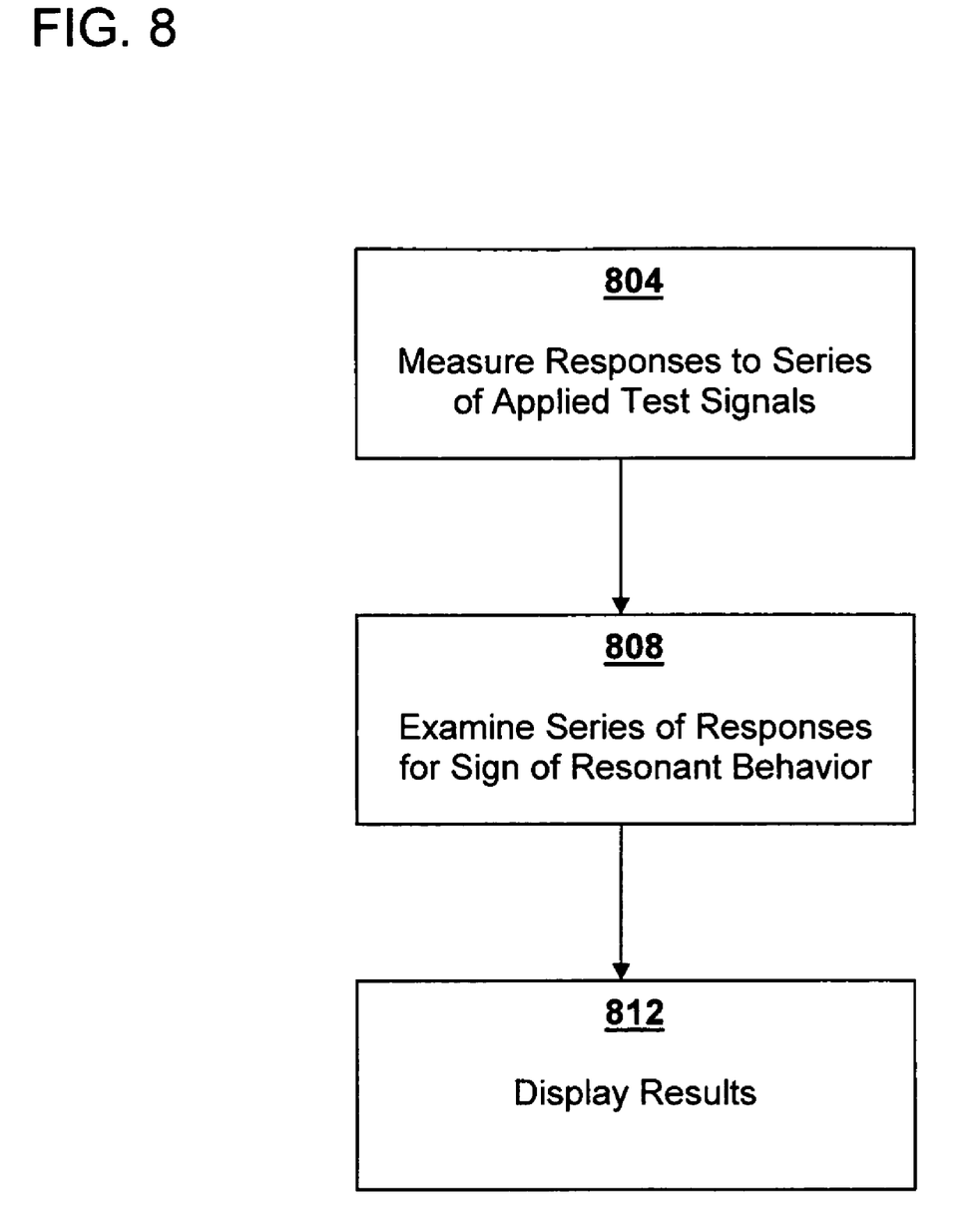
FIG. 8 is a flow chart of steps to test a pick-up coil.

The process of testing the pick-up coil can be represented by a the flow chart in FIG. 8. In step 804, a series of alternating currents of frequencies suitable to test for the expected resonant behavior of the pick-up coil are injected onto the connection between the pick-up coil and the pick-up coil tester. This pick-up coil tester can be located at one location with wiring connections to a series of pick-up coils at a variety of locations. The series of alternating voltage waveforms are detected in response to the injection of the various alternating current test signals.

In step 808, the pattern of voltage waveforms are examined for a response near the estimated resonant frequency for the pick-up coil. A relatively flat response across the set of input frequencies indicates a pick-up coil that is not functioning correctly. It is difficult to give absolutes here. If one of the test frequencies is extremely close to the actual resonant frequency of the pick-up coil, then the reaction to that input frequency will be more pronounced than another pick-up coil that is performing well but is not being tested with a test frequency as close to the actual resonant frequency.

With experience one may be able to set criteria for good, failed, and operating but needing replacement when convenient as the pick-up coil is showing signs that it is heading towards failure. For example, when measuring voltage, it may be that a 5 dB difference between the test frequency closest to resonance and other test frequencies away from resonance indicates a properly operating pick-up coil. Something slightly less than 5 dB may indicate a pick-up coil that needs to be replaced when convenient. A difference below a second lower threshold may be used to identify the pick-up coil as failed and needing immediate replacement.

In step 812, the response for each coil is displayed so that the presence or absence of a response at resonance can be examined. One of skill in the art will recognize that the graphic display could be replaced with an evaluation of the response set to check for the presence or absence of a resonance response by a computer program rather than by display of the response for a human to view.

One of skill in the art will recognize that a set of test frequencies could be selected so that there are in theory two test frequencies that are equally close to the expected resonant frequency of a particular coil. While it may be impractical and rare to get two test frequencies that are exactly equidistant from the expected resonant frequency it may happen that a resonant frequency of a particular pick-up coil is roughly half-way between two test frequencies.

Many Different Ways to Evaluate the Responses to the Test Signals.

Those of skill in the art will recognize that the measurement of the responses to the application of alternating current signals at various frequencies may be done in a number of ways. The analog signal could be analyzed as an analog signal to capture the peak voltage, power, phase-shift, or some other measurable quality that would differ at the resonant frequency. For example, the difference in phase between the injected current and the measured voltage should go to a minimum absolute value at the test frequency close to resonance.

The voltage waveforms can be processed digitally to detect resonant behavior. In an implementation of the pick-up coil test function in a power line carrier receiver, the signal processing to described in connection with FIG. 2 is used to generate a series of digital values representative of a sampled voltage waveform.

Once a set of digital values is collected, it could be processed in a number of different ways to detect resonant behavior. The maximum value or the maximum and minimum values could be determined for the samples associated with the waveform associated with each test frequency. Thus while the sampled digital values may not capture the absolute maximum and minimum values, the process will be sufficiently accurate to show a significant reduction in signal at or near the resonant frequency.

Alternatively, rather than comparing the many digital valued to obtain the maximum value, the value associated with a projected maximum value could be examined directly as the frequency of the input signal and the expected phase shift in the voltage waveform relative to the current input would be known for a given model of pick-up coil. Thus, in a particular implementation, only samples of the analog signal taken at times expected to be at the maximum voltages are converted to digital values to minimize processing. The set of maximum values for the set of responses to the set of input frequencies could be examined to determine if the set shows evidence of resonant behavior.

Another way of processing the voltage waveforms uses additional steps that are used as part of the measurement of the phase shift in the power line carrier waveforms that convey data by Phase-Shift Keying. This example is given to help show the range of methods that could be used to look for resonant behavior and not as a limitation required in every claim.

A) Synchronizing the injection of the current waveform of a particular frequency with the collection of digitized samples of the response voltage waveform. In one implementation, all actions are done in relation to a detection of a zero line crossing of the power grid frequency.

B) Converting at least a portion of a received voltage waveform carried on the carrier frequency to a set of digital samples, the portion corresponding to the analog signal received during a sampling window established in relation to the detected zero crossing on the alternating current operated at power grid frequency.

C) Using the detected zero crossing as a trigger to create a set of digital values of an ideal sine wave with a frequency substantially equal to the injected test frequency and creating a set of digital values of an ideal cosine wave with a frequency substantially equal to the injected test frequency.

D) Multiplying the subset of sampled digital values from the portion of the response voltage waveform with a corresponding set of created digital values from the ideal sine wave and storing the sum of the products as the In-Phase Component ("I") of the set of digital samples.

E) Multiplying the subset of sampled digital values from the portion of the response voltage waveform with a corresponding set of created digital values from the ideal cosine wave and storing the sum of the products as the Quadrature Component ("Q") of the set of digital samples.

At this point, the accumulated values for the I and Q components can be associated with the test frequency. The process can be repeated to gather I and Q components for other test frequencies. (Unlike the process of working with the relatively weak power line carrier waveforms, there is no need here to shift the accumulator values until the most significant bit of the larger value becomes a one.)

If the test signals are properly conditioned to compensate for expected phase shifting by the circuitry that processes the response voltage waveform, then the I value for the test frequency at or near resonance should be at or near a maximum as the voltage waveform should be substantially in phase with the ideal sine wave. Conversely, the Q value should be at the minimum absolute value at or near the resonant frequency.

The accumulated values in the I and Q accumulators can be further processed to obtain a phase offset from an ideal sine wave for the voltage waveform by obtaining the arctangent of the (In Phase Component divided by the Quadrature Component) as is done to decode the binary information conveyed by phase shift keying in the received analog signal. The set of phase shifts for the voltage waveforms observed in response to the set of injected alternating currents of different frequencies should show the transition of phase shift from leading to lagging (depending on the whether the frequencies increase or decrease during the test series) with a phase difference of close to zero near the resonant frequency. A lack of a pattern indicative of resonant behavior indicates a problem with the pick-up coil.

Yet another way to work with the accumulator values is to take the square root of the sum ((accumulated value for I)$^2$+(accumulated value for Q)$^2$). This magnitude is useful for showing the relative attenuation of the voltage waveform in response to one test frequency versus another test frequency. (The absolute values in the accumulators will be a function of the number of digitized samples that are multiplied and accumulated so the relative magnitude is what is important).

While the concept is best understood in connection with the multiplication of the digital samples of the voltage waveform against an ideal sine wave and an ideal cosine wave, the method can be implemented using square waves in lieu of the sine wave and the cosine wave as calculating the values for the square waves is less resource intensive than calculating the values for ideal sine and cosine waves. (The square waves would need to have the appropriate frequency to match the input signal applied to the pick-up coil.) Other surrogates for the sine wave and cosine wave could be used in lieu of the sine wave and cosine wave in order to save resource expenditure.

Alternative Embodiments

One implementation of the present invention injects the entire set of test frequencies during one interval between zero line crossings of the frequency of the alternating current used to deliver power as it is possible to inject and interpret 16 test frequencies during that interval. One implementation actually tests all pick-up coils in parallel during one interval between zero line crossings. The present invention does not require that the entire set of test frequencies be injected in one period between zero crossings. The set of frequencies could be applied in two or more periods between zero crossings. Taken to an extreme, a single frequency could be injected in a period between zero crossings, perhaps before or after receiving data via power line carrier in another portion of that same period. Thus, taken to an extreme, the testing process for the pick-up coil could be a part of the continuous operation of the receiver.

The examples given above have used test frequencies above and below the resonant frequency in addition to at least one frequency close to the resonant frequency. Depending on the parameter measured, this will generate a dip or a spike in the responses at the resonant frequency which provides a strong visual indication of resonant behavior. One could implement the present invention using a set of test frequencies that start or end at the resonant frequency so that the range of test frequencies is either above or below the resonant frequency rather than forming a range that extends beyond the resonant frequency in both directions.

When using a power line carrier receiver that is adapted to detect a zero line crossing and then read data during a period of approximately 6.4 msec during the middle of the 8.33 msec period between zero line crossings, it may be convenient to sample during the same 6.4 msec time gap as this may allow implementing the pick-up coil testing with as few deviations as possible from the process used to decode the power line carrier data. However, it is not necessary to sample during this 6.4 msec period away from either of the two zero line crossings as the response to the pick-up coil testing is not being carried on the alternating current of the power grid. Thus, the lack of coherent energy near the zero line crossing is not a problem. The injection of the alternating current into the pick-up coil or the measurement of the voltage waveform at that test frequency could be done at any time without coordination with the zero line crossing.

While it is advantageous that the set of pick-up coils attached to a receiver can be tested even when the bus carrying the power line carrier signal is energized, it is not necessary that the power distribution bus be energized. The pick-up coil may be tested by the injection of a test signals while the power distribution bus is not energized.

One implementation of the present invention uses the power line carrier receiver as the testing apparatus for injecting test frequencies and processing the results. While it may be efficient to use a receiver as some of the circuits can be used for this purpose in addition for the purpose served as a power line carrier receiver, the invention could be implemented by a testing device that is not also the power line carrier receiver.

One implementation of the present invention carefully selects test frequencies so that there is not an overlap between a test frequency and a carrier frequency, even though both groups of frequencies are selected to be in the proximity of the resonant frequency of the pick-up coil. Thus, a sufficiently sensitive receiver, perhaps using a decoder as described in the above-references Signal Decoding Method and Apparatus (U.S. patent application Ser. No. 11/113,843) could process incoming data from power line carrier transmitters during the same intra-zero crossing period used to test the pick-up coil. In most instances this would not be necessary as the testing of the pick-up coil does not need to happen with any significant frequency of testing so that not reading incoming power line carrier messages during the relatively infrequent testing of the pick-up coil would not have any significant effect on the monitoring of the power distribution network.

One of skill in the art will recognize that alternative embodiments set forth above are not universally mutually exclusive and that in some cases alternative embodiments can be created that implement two or more of the variations described above.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of testing a power line carrier pick-up coil while the pick-up coil is connected to an energized first power distribution bus in a power distribution network, the method comprising:

creating a connection between a first pick-up coil to a power line carrier receiver to communicate analog signals conveyed by power line carrier from a power line carrier transmitter at a remote location over a first phase of the first power distribution bus, the analog signal conveyed from a point of injection on a secondary side of a transformer across the transformer to a primary side of the transformer; through a closed breaker; through a primary fuse; over a feeder bus; through a closed substation breaker and to the first pick-up coil;

receiving analog signals at the first pick-up coil and conveying the analog signals to the power line carrier receiver;

initiating a pick-up coil test to include testing of the first pick-up coil while the first power distribution bus remains energized;

applying a set of at least two test inputs, each test input have a test frequency such that at least two different test frequencies are applied to the connection between the first pick-up coil and the power line carrier receiver and monitoring the response from the first pick-up coil on the connection between the first pick-up coil and the power line carrier receiver, the set of at least two test frequencies including at least one closest test frequency that is the closest of the various test frequencies to an expected resonance frequency for the first pick-up coil; and comparing:

a response of the first pick-up coil to a closest test frequency with;

a set of responses to a set of at least one test frequency that is not the closest test frequency to determine whether the first pick-up coil is exhibiting resonant behavior.

2. The method of claim 1 wherein the set of at least one closet test frequency includes one test frequency below the expected resonance frequency for the first pick-up coil and a second test frequency equidistant above the expected resonance frequency.

3. The method of claim 1 wherein all of the at least two test frequencies are greater than the expected resonance frequency for the first pick-up coil.

4. The method of claim 1 wherein all of the at least two test frequencies are less than the expected resonance frequency for the first pick-up coil.

5. The method of claim 1 wherein some of the at least two test frequencies are greater than the expected resonance frequency for the first pick-up coil and some of the at least two test frequencies are less than the expected resonance frequency of the first pick-up coil.

6. The method of claim 1 wherein the step of comparing the response of the first pick-up coil to a closest test frequency compared with a set of responses to a set of at least one test frequency that is not the closest test frequency to determine whether the first pick-up coil is exhibiting resonant behavior includes displaying a parameter representative of the response to a given test frequency for the set of at least two test frequencies.

7. The method of claim 6 wherein the displayed parameter is phase shift of a voltage waveform measured as a response of the first pick-up coil to an application of alternating current at a test frequency, and the phase shift is measured relative to the phase of the applied alternating current.

8. The method of claim 6 wherein the displayed parameter is proportional to a magnitude of a voltage waveform measured as a response of the first pick-up coil to a test frequency.

9. The method of claim 6 wherein the displayed parameter conveys a relative magnitude of the voltage waveform measured as a response of the first pick-up coil to a first test frequency compared to the relative magnitude of a response of the first pick-up coil to a second test frequency.

10. The method of claim 1 wherein the step of comparing the response of the first pick-up coil to a closest test frequency compared with a set of responses to a set of at least one test frequency that is not the closest test frequency to determine whether the first pick-up coil is exhibiting resonant behavior does not include converting samples of the responses of the first pick-up coil to digital values.

11. The method of claim 1 wherein the step of comparing the response of the first pick-up coil to a closest test frequency compared with a set of responses to a set of at least one test frequency that is not the closest test frequency to determine whether the first pick-up coil is exhibiting resonant behavior includes converting samples of the responses of the first pick-up coil to digital values.

12. The method of claim 11 wherein the digital values of the samples of the responses of the first pick-up coil are examined to locate the maximum voltage for the response of the pick-up coil to each of the test frequencies.

13. The method of claim 1 wherein the step of comparing a response of the first pick-up coil to a closest test frequency compared with a set of responses to a set of at least one test frequency that is not the closest test frequency to determine whether the first pick-up coil is exhibiting resonant behavior includes a step of processing the monitored responses of the first pick-up coil to the applied set of at least two test frequencies to associate a set of at least one parameter reflective of the monitored response of the first pick-up coil with the test frequency applied to the first pick-up coil to cause the monitored response.

14. The method of claim 13 wherein the set of at least one parameter includes a value from an accumulator containing the accumulated products of digitized samples of the monitored response to a particular test frequency multiplied by a set of values.

15. The method of claim 14 wherein the set of values are based on the magnitude of a waveform at a sequence expected at various instances of time for a waveform having the same frequency as the test frequency and a particular phase offset from the test input.

16. The method of claim 15 wherein the particular phase offset from the test input is zero degrees.

17. The method of claim 15 wherein the waveform is a sine wave having a specific phase offset from the injected test input.

18. The method of claim 15 wherein the waveform is a square wave having a specific phase offset from the injected test input.

19. The method of claim 14 wherein a parameter associated with each test frequency is the value of an In-Phase accumulator.

20. The method of claim 14 wherein a parameter associated with each test frequency is the value of an Quadrature Component accumulator.

* * * * *

UNITED STATES PATENT AND TRADEMARK OFFICE
CERTIFICATE OF CORRECTION

| | | |
|---|---|---|
| PATENT NO. | : 7,606,298 B1 | Page 1 of 1 |
| APPLICATION NO. | : 11/453272 | |
| DATED | : October 20, 2009 | |
| INVENTOR(S) | : Weber, Jr. et al. | |

It is certified that error appears in the above-identified patent and that said Letters Patent is hereby corrected as shown below:

Column 14, line 36, the word "have" should be changed to the word "having".

Column 14, line 54, the words "set of" should be deleted.

Column 14, line 55, the word "closet" should be changed to the word "closest".

Column 16, line 36, the word "an" should be changed to the word "a".

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,606,298 B1  Page 1 of 1
APPLICATION NO. : 11/453272
DATED : October 20, 2009
INVENTOR(S) : Weber, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 736 days.

Signed and Sealed this

Fifth Day of October, 2010

David J. Kappos
*Director of the United States Patent and Trademark Office*